Patented Feb. 29, 1944

2,342,679

UNITED STATES PATENT OFFICE 2,342,679

MATERIAL FOR RECORDS

Harald Mediger, Dessau, Germany; vested in the Alien Property Custodian

No Drawing. Application June 8, 1940, Serial No. 339,491
In Germany June 22, 1939

3 Claims. (Cl. 274—41)

This invention relates to a base material for Gramophone records and other sound records and to the manufacture of same, said records bearing on one or both surfaces mechanical sound registrations in form of grooves cut into the material by means of a stylus according to the Edison or to the Berliner method, as disclosed in U. S. P. 272,786 granted November 8, 1887.

It is known to manufacture Gramophone records and sound records on film strips from synthetic materials consisting of vinyl polymers.

Compared with Gramophone records manufactured from Celluloid and shellac mixtures, such records have the advantage of being less fragile and chemically more resistant. They are true to scale, but also have the disadvantage of being thermoplastic and become useless already at relatively low temperatures, for instance slightly above 100° C.

A number of other artificial materials not possessing these disadvantages are not suited for sound records on account of difficulties arising during the manufacturing process.

It is an object of the invention to provide a new and more suitable base material of the above mentioned type for the manufacture of sound records, especially Gramophone records.

A further object is to provide a base material highly resistant towards wear and tear and atmospheric influences.

A further object is the provision of an unbreakable material for said records.

These and other objects will become apparent from the following description.

The present invention is based on the observation that Gramophone records and other carriers for sound recording are most advantageously manufactured from linear synthetic condensation products, for instance superpolyamides, superpolyesters, superpolyethers, superpolyanhydrides, superpolyacetals, polyureas, polyurethanes, polyhydrazides. Such base material for sound records possesses excellent hardness in the finished state, which increases the resistance towards wear and tear and reduces the surface noises to a minimum. Such records are unbreakable, chemically very resistant and, generally speaking, not at all sensitive towards atmospheric influences, for instance moist air. Also their resistance towards higher temperatures is excellent.

These carriers for sound recording according to the present invention may be obtained by casting, if necessary centrifugal casting, by pressing, forming or dye-casting. The Gramophone records may be embossed by pressing in the matrix or by cutting with a stylus which may be heated, if so desired. In this case it is advantageous to use a plasticized material. As plasticizers are cited by way of example monomeric ε-capro lactam, also solvents in a quantity up to 20%, for instance phenol, o- or p-cresol, o-oxydiphenyl and the like, furthermore high polymeric vinylethers, for instance polymerized bornylvinylether.

Most suitable as base material used in the manufacture of Gramophone records according to this invention are for instance the superpolyamides, superpolyesters, superpolyethers, superpolyanhydrides and superpolyacetals produced according to U. S. Patents Nos. 2,071,250, 2,071,-251, 2,071,252, 2,071,253. Also the polyamides according to U. S. Patent application Ser. No. 220,266, filed July 20, 1938, now Patent No. 2,241,-321 granted to Paul Schlack and the polyamides and polyurethanes according to U. S. Patent application Ser. No. 277,948, filed June 7, 1939, by Emil Hubert, Paul Schlack and Herman Ludewig, may be employed. As suitable examples of polyureas are those produced in Example 4 and of a suitable polyurethane is that produced in Example 9 of the last mentioned patent application. Example 4 reads as follows:

"13 grams of octamethylene-diurethane $(CH_3.O.CO.NH.(CH_2)_8.NH.CO.OCH_3)$ and 6 grams of hexamethylene diamine are heated for two hours at 240 to 250° C. in an open glass vessel while ammonia is introduced in vapor form. There is formed a viscous mass which solidifies on cooling and yields a whitish-yellow horn-like resin, which possesses the property of being capable of being drawn out into fibers. After a further heating for 5 to 7 hours at 240 to 250° C. the resin is suitable for spinning. It softens between 195 and 200° C.

The resins obtained in the same manner from octamethylene diurethylane and octa-methylene diamine or from octamethylene diurethylane and ethylene diamine show similar properties. They are light-yellow to greenish in color, have a horn-like appearance and soften at about 225° and 200° C. respectively. Hexamethylene-diurethane or ethylene-diurethane likewise yield resinous condensation products together with diamines."

Example 9 reads as follows:

"5 grams of octamethylene diurethylane $(CH_3.O.CO.NH.(CH_2)_8NH.CO.OCH_3)$ and 1.5 grams of 1,6-hexanediol are heated in an atmosphere of nitrogen four hours at 220° and subsequently at 250° C. A white hard resin results after cooling."

To the substances mentioned above plasticizers, fillers, pigments and the like may be added. Film strips for sound recording consisting of linear synthetic polycondensation products may be oriented by cold drawing which increases their tenacity considerably.

I claim:

1. A sound record bearing mechanically produced registrations of sound on at least one of its surfaces and consisting essentially of a linear synthetic condensation product having a crystalline structure of the group consisting of superpolyamides, polyureas, and polyurethanes.

2. A Gramophone record in disc shape bearing mechanically produced registrations of sound on at least one of its surfaces and consisting essentially of a linear synthetic condensation product having a crystalline structure of the group consisting of superpolyamides, polyureas, and polyurethanes.

3. A sound record in the form of a film strip bearing mechanically produced registrations of sound on at least one of its surfaces and consisting essentially of a linear synthetic condensation product having a crystalline structure of the group consisting of superpolyamides, polyureas, and polyurethanes.

HARALD MEDIGER.